July 16, 1968  D. Z. SOMMERS  3,392,807

SELF-ENERGIZING DISC BRAKE

Filed Jan. 27, 1967

INVENTOR.
DONALD Z. SOMMERS
BY *Fulwider, Patton, Rieber,*
*Lee and Utecht*
ATTORNEYS

United States Patent Office

3,392,807
Patented July 16, 1968

---

3,392,807
SELF-ENERGIZING DISC BRAKE
Donald Z. Sommers, 3356 Kallin Ave.,
Long Beach, Calif. 90808
Filed Jan. 27, 1967, Ser. No. 612,159
4 Claims. (Cl. 188—73)

ABSTRACT OF THE DISCLOSURE

A disc brake having a stationary arm supported by non-rotational structure of the vehicle, a movable arm carrying an actuating brake pad, and hydraulic cylinder means actuable to move the pad against the disc brake surface, the stationary and movable arms mounting the opposite extremities of a main brake pad and including means on said arms operable upon movement of the movable arm in the direction of disc rotation to press the main pad against the disc brake surface.

---

BACKGROUND OF THE INVENTION

Field of the invention

The present invention relates generally to a disc brake and more particularly to a disc brake that is self-energizing.

Description of the prior art

Disc brakes of the self-energizing type have heretofore generally been of complex design, and most are limited to the use of brake pads which are positively actuated by hydraulic cylinder means. There is lacking any suggestion of using the positively actuated brake pads to effect additional braking through utilization of the rotational force of the disc brake surface.

SUMMARY OF THE INVENTION

Accordingly, it is an object of the present invention to provide a disc brake which utilizes the rotational force of the disc surface to supplement the direct braking force provided by hydraulically actuated brake pads.

Another object of the invention is the provision of a disc brake of the type described that includes confronting brake pads that act equally on opposite surfaces of the disc to provide balanced, opposed axial forces on the disc.

A further object of the invention is to provide a disc brake of the type described having floating or axially movable brake pads adapted to ride on opposite sides of the rotating disc for accommodation to disc irregularities.

A still further object of the present invention is to provide a disc of the type described that is of simple design, easy to manufacture and effective to create both a positive braking action and a supplemental braking action utilizing brake disc rotation.

Other objects and features of the present invention will become apparent from consideration of the following description, taken in conjunction with the accompanying drawing.

DESCRIPTION OF PREFERRED EMBODIMENT

Figure 1:
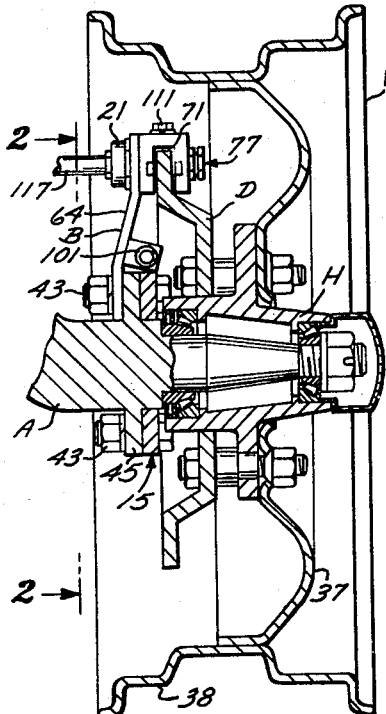
FIG. 1 is a sectional view through the center of a vehicle wheel showing a disc brake embodying the present invention.
Figure 2:
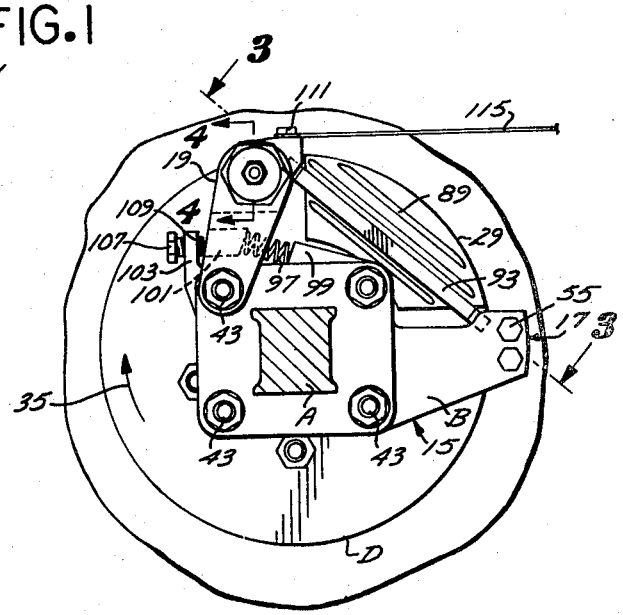
FIG. 2 is a view taken along the line 2—2 of FIG. 1.
Figure 3:
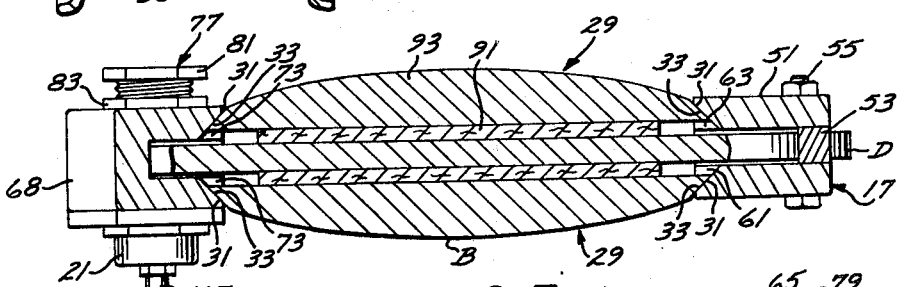
FIG. 3 is a sectional view in enlarged scale taken along the line 3—3 of FIG. 2.

Referring to the drawing and particularly to FIGS. 1 and 2 thereof, a preferred form of disc brake B is shown in association with a wheel W of a vehicle, and supported from the axle A of the vehicle. The disc brake B comprises, generally, an annular disc D affixed to a rotatable vehicle hub H, which is mounted on the axle A; a fixed mount 15 which fixedly supports a forwardly extending stationary arm 17; a movable arm 19 pivotally connected at its inner end to the mount 15; and a hydraulic cylinder 21 carried by the arm 19 and including an actuating brake pad 23 and a cylinder piston 25 which mounts the pad 23. In addition, the brake B includes a pair of main brake pads 29 disposed on opposite sides of the disc D and carried between the stationary arm 17 and the pivotal arm 19. Wedge surfaces 31 formed on opposite ends of the brake pads 29 are adapted to engage complementary wedge surfaces 33 provided on the arms 17 and 19 upon depression of the vehicle brake pedal (not shown). Such depression actuates the piston 25 to move the actuating pad 23 against the disc surface. This relatively small braking force causes the arm 19 to be carried with the rotating disc D, as indicated by the directional arrow 35, to effect wedging together of the surfaces 31 and 33 to thereby cooperatively press the main pads 29 against the disc D. Thus, the initial positive braking force is augmented with the substantially greater force provided by the actuating pads 29 acting against the surfaces of disc D.

The vehicle wheel W includes a radial web 37 which is bolted to the hub H and carries a rim 38 on its periphery for mounting a pneumatic tire (not shown).

Figure 5:
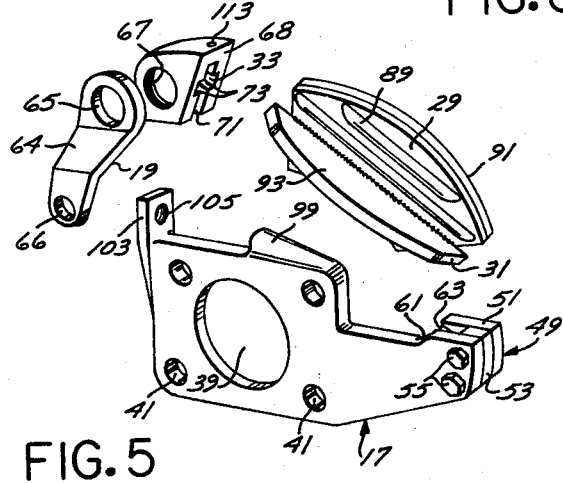
FIG. 5 is a partial exploded view of the brake shown in FIG. 1.

The mount 15 includes a central bore 39 to receive the axle A, and is provided with four spaced bores 41, FIG. 5, which receive nut and bolt assemblies 43 to fasten the mount 15 to the outer side of a mounting flange 45 of the axle A. The fixed arm 17 of the mount is preferably integral with the mount 15, extending in a generally forward direction relative to the vehicle. A U-shape structure 49 is defined at the extremity of the arm 17 by the arm 17, a return 51, and a spacer 53 which spaces the return 51 from the arm 17. The return 51 and spacer 53 are secured to the arm 17 by a pair of nut and bolt assemblies 55.

The wedge surface 33 of the arm 17 for abutting the forward extremity of the inner main brake pad 29 is defined by the bottom of an inclined groove 61 provided in the arm 17, while the wedge surface 33 for abutting the forward extremity of the opposite or outer main brake pad 29 is defined by the bottom of an inclined groove 63 provided in the return 51. In the preferred embodiment these surfaces 33 form an angle of approximately 45 degrees with the disc D braking surface.

The movable arm 19 is offset axially outwardly at 64, as best seen in FIGS. 1 and 5, and includes bores 65 and 66 at its opposite extremities. The bore 66 receives the bolt of one of the nut and bolt assemblies 43, which secure the mount 15 in position, to thereby also secure the arm 19 to the inner side of the axle flange 45.

Figure 4:
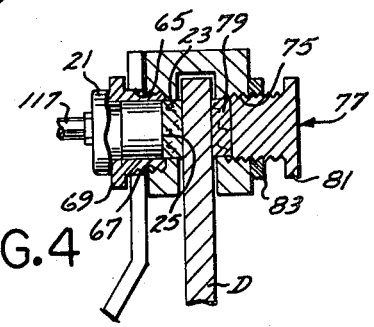
FIG. 4 is a partial vertical sectional view in enlarged scale taken along the line 4—4 of FIG. 2.

The hydraulic cylinder 21 fits freely through the bore 65 and screws into a threaded bore 67 of a U-fitting 68 in abutment with the rearward extremities of the pair of main pads 29. Thus, as shown in FIG. 4, the cylinder 21 and the depending U-fitting 68 are freely movable inwardly and outwardly relative to the disc D. The U-fitting 68 includes a vertical passage 71 for receiving the peripheral edge of the disc D. The passage 71 is characterized by axial grooves 73 in its opposite walls to form the inclined surfaces 33. A second threaded bore 75 is formed in the U-fitting 68 opposite the bore 67 and receives a plug 77 which carries an actuating brake pad 79 on its inner end. The outer end of the plug 77 includes an integral hexagonal wrench receiving head 81 and a lock nut 83 mounted on the plug for cooperation with the U-fitting 68 to lock the plug 77 in axial position in the bore 75.

A pair of opposed main brake pads 29 are each formed with longitudinal reinforcing ribs 89 and each includes a friction lining 91 bounded to the face opposite the ribs 89. In addition, a longitudinal strut 93 is welded to the back of each of the pads 29, and is beveled at its opposite ends to define the wedge surfaces 31. The opposite ends of the pair of struts 93 are carried in the grooves 61, 63, and 73 to support the pads 29 in operative position adjacent opposite faces of the disc D.

Referring now to FIGS. 2 and 5, a compression spring 97 biases the movable arm 19 in a direction opposite the direction of rotation of disc D. One end of the spring 97 abuts a stop 99 formed on the upper portion of the mount 15, and the opposite end of the spring 97 abuts a stop 101 integral with and projecting axially outwardly of the arm 19.

The mount 15 includes an integral, upwardly projecting flange 103 which has a threaded bore 105 for receiving an adjustment stud 107. The inner end of the stud 107 abuts the end 109 of the stop 101 opposite the spring 97 to limit the extent of rearward travel of the arm 17 under the bias of the spring 97. Thus, as the linings 91 become worn the stud 107 can be advanced to move the arm 17 forward, moving the wedge surfaces 33 farther up on the surfaces 31 to urge the pads 29 into closer proximity with the surface of disc D.

The movable arm 19 is manually actuable through a stud 111 which is screwed into a threaded bore 113 provided in the U-fitting 68, the stud 111 anchoring one end of the usual vehicle hand brake cable 115. When the hand brake (not shown) is pulled, the cable 115 pivots the arm 17 forwardly and presses the pads 29 against the disc D.

The movable arm is hydraulically actuable upon depression of the usual vehicle brake pedal (not shown). That is, such depression causes brake fluid from the main brake cylinder (not shown) to flow through the connecting tubing 117 and actuate the cylinder 21. This causes the piston 25 to extend and force the actuating pad 23 against the adjacent surface of the disc D, as best shown in FIG. 4. This, in turn, causes the cylinder 21 to be forced to the left, carrying the U-fitting 68 with it and thereby urging the actuating pad 79 against the disc surface. Thus, the pads 23 and 79 will be pressed against the opposite sides of the disc D with substantially equal force. This, of course, doubles the braking force which would be derived in using only the pad 23. The foregoing structure is preferred, but the pad 79 could be eliminated, if desired, provided that the arm 17 is sufficiently rigid to resist axial flexure.

In the preferred embodiment, when the pads 23 and 79 engage the disc D, the arm 19 will be rotated with the disc D. This causes the wedging surfaces 33 on the arms 17 and 19 to engage and press against the surfaces 31 on the ends of the struts 93, thereby urging the main pads 29 against their respective surfaces of the disc D. This braking action is in addition to the braking action provided by reason of the piston 25 forcing the pad 23 and the pad 79 against the opposite faces of the disc D. Since the effective wedging angle between the surfaces 31 and 33 is 45 degrees with respect to the braking surfaces of the disc D, the frictional force resulting from actuation of the pads 23 and 79 is split into approximately equal components, one acting normal to the disc D surface and one acting parallel therewith. Consequently there will be a component force pressing in on each end of each of the pads 29 that is approximately half the total braking force effected by both pads 23 and 79, thus resulting in a total normal force on each pad that is equal to the total braking force effected by both of the pads 23 and 79. Thus, with the arrangement described it can be seen that the force exerted by the cylinder 21 is multiplied several times to provide a substantially larger effective braking force than that which would result from utilizing the piston force alone.

As the linings 91 wear and become thinner the arm 19 can be adjusted by screwing the stud 107 in to move the arm 19 closer to the arm 17, thus moving the normal non-braking position of the pads 29 closer to their respective disc D surfaces.

Although only one brake B has been described in association with the disc D, it will be clear that as many pairs of pads 29 and associated actuating pads 23 and 79 as desired may be mounted around the wheel W to act on the disc D. It will also be clear that by providing pads 23 and 79 having a relatively high coefficient of friction, the pressing force on the pads 29 will likewise be high relative to the cylinder force. Also, the angles formed by the surfaces 31 and 33 with the disc D can be made smaller to give a larger force component normal to the surfaces of the disc D, thus increasing the force pressing in on the pads 29 as a result of the braking force effected by the pads 23 and 79.

From the foregoing description, it is apparent that the brake of this invention is of straightforward design, easy to manufacture and extremely effective in braking the vehicle on which it is installed.

Various modifications and changes may be made with regard to the foregoing detailed description without departing from the spirit of the invention or the scope of the following claims.

I claim:
1. A brake for a vehicle that includes an axle, a wheel and a brake disc rotatable with the vehicle wheel, said brake comprising:
   a mount adapted to be affixed to non-rotatable structure of the vehicle axle, said mount including a fixed arm projecting adjacent one side of said disc and having a first wedge surface facing said one side;
   a rotatable arm pivotally attached to said mount and projecting adjacent said one side, said arm including a first fitting formed with a second wedge surface facing said one side;
   a first actuating brake pad carried by said rotatable arm and movable toward and away from said one side of said disc;
   hydraulic cylinder means operable to move said actuating brake against said one side of said disc; and
   a main brake pad located adjacent said one side of said disc and extending between and held at its extremities by said rotatable and said fixed arms, said pad including third and fourth wedge surfaces for cooperatively engaging said first and second wedge surfaces when said rotatable arm is rotated toward said fixed arm to press said main pad against said one side of said disc.
2. A brake as set forth in claim 1 wherein said first fitting spans the edge of said disc and includes:
   a fifth wedge surface facing the side of said disc opposite said one side;
   wherein said brake includes:
   a second fitting carried by said fixed arm, spanning the edge of said disc and formed with a sixth wedge surface facing said side of said disc opposite said one side; and
   a second main brake pad located adjacent said side of said disc opposite said one side and extending between and held at its extremities by said first and second fittings, said second main brake pad including seventh and eighth wedge surfaces for cooperatively engaging said fifth and sixth wedge surfaces upon rotation of said rotatable arm toward said fixed arm to press said second main brake pad against said side of said disc opposite said one side.
3. A brake as set forth in claim 1 wherein said rotatable arm includes:
   a cylinder receiving bore;

said first fitting spanning the edge of said disc and mounting a second actuating brake pad disposed opposite said first actuating pad; and wherein said cylinder means is mounted in said bore and is slideable therein whereby when said cylinder means is actuated to press said first and second actuating pads against opposite sides of said disc, said fitting is free to move axially in said bore.

4. A brake as set forth in claim 3 wherein said first fitting includes:

a fifth wedge surface facing the side of said disc opposite said one side;

wherein said brake includes:

a second fitting mounted on said fixed arm and including a sixth wedge surface facing said side of said disc opposite said one side; and a second main brake pad disposed on said side of said disc opposite said one side and extending between and carried at its extremities by said rotatable and fixed arms, said pad including seventh and eighth wedge surfaces for engaging said fifth and sixth wedge surfaces upon rotation of said rotatable arm toward said fixed arm.

References Cited

UNITED STATES PATENTS

| 3,185,257 | 5/1965 | Caero | 188—72 |
| 3,283,860 | 11/1966 | Watanabe. | |
| 3,318,420 | 5/1967 | Adams | 188—73 |

FOREIGN PATENTS

| 960,036 | 6/1964 | Great Britain. |

MILTON BUCHLER, *Primary Examiner.*

GEORGE E. A. HALVOSA, *Examiner.*